United States Patent [19]

Gaw, Jr.

[11] 3,750,014

[45] July 31, 1973

[54] FREQUENCY MEASURING APPARATUS

[75] Inventor: Norman W. Gaw, Jr., Boonton, N.J.

[73] Assignee: Gaw Co. Inc., Lincoln Park, N.J.

[22] Filed: July 23, 1971

[21] Appl. No.: 165,061

[52] U.S. Cl. ............................................. 324/79 D
[51] Int. Cl. ............................................ G01r 23/14
[58] Field of Search ...................... 324/79 R, 79 D; 328/140; 235/92 FQ

[56] References Cited
FOREIGN PATENTS OR APPLICATIONS 557,270    5/1958   Canada ............................. 324/79 R
1,172,295  11/1969  Great Britain .................... 324/79 D Primary Examiner—Alfred E. Smith
Attorney—Philip G. Hilbert

[57] ABSTRACT

The frequency of an unknown signal is measured by heterodyning the signal with a signal of known frequency. The number of cycles of the difference signal resulting from the heterodyning occurring during a given period of time is counted as is the number of cycles of the signal with known frequency occurring during another given period of time. The sum of the two counts is related to the frequency of the unknown signal.

6 Claims, 1 Drawing Figure

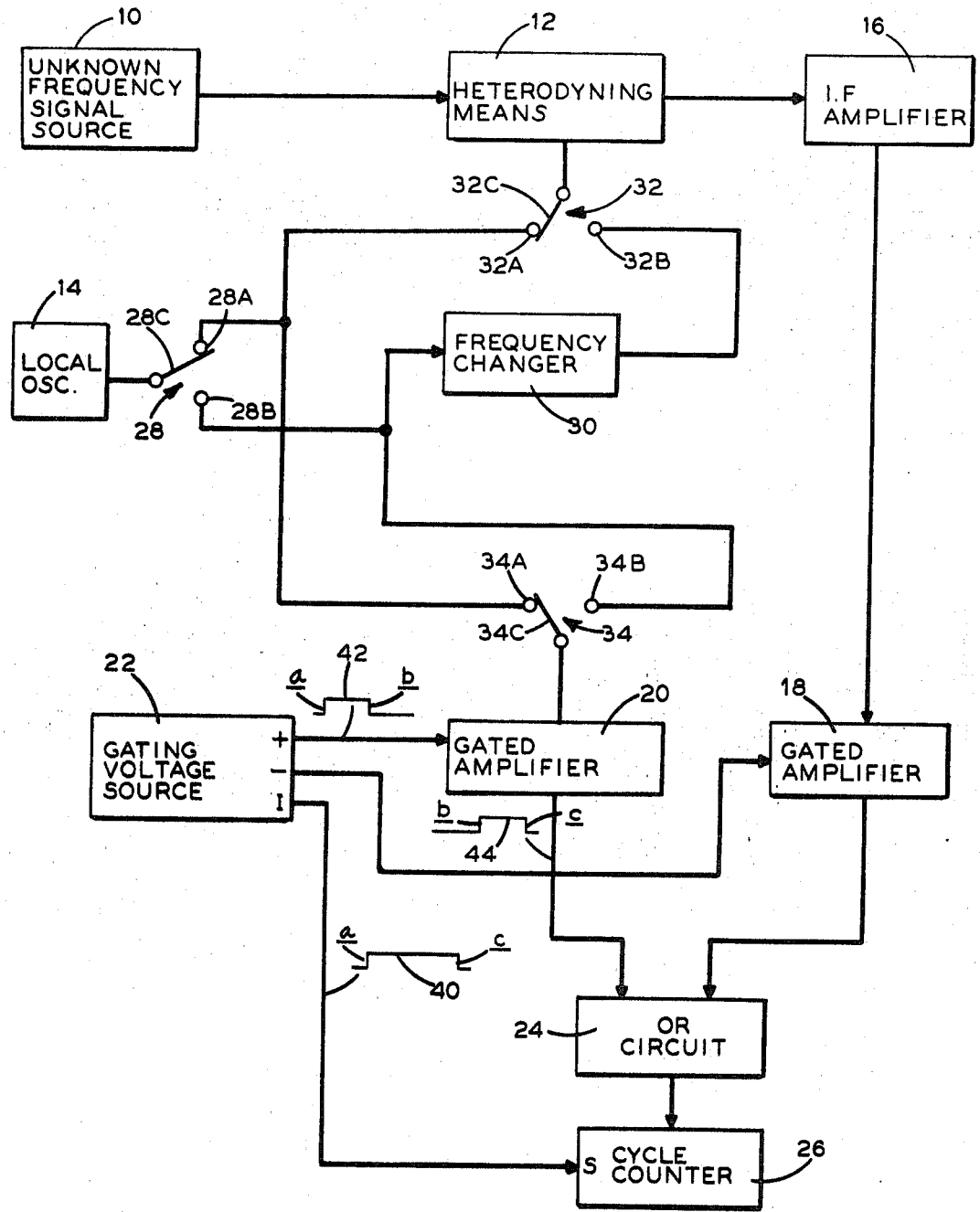

FREQUENCY MEASURING APPARATUS

BACKGROUND OF THE INVENTION

This invention pertains to frequency measuring apparatus and more particularly to such apparatus utilizing cycle counting techniques. There is often the need to measure the frequency of periodically varying signals to determine the quality of operation of systems such as communication or radar systems which utilize carrier signals. Heretofore the measuring apparatus relied on tuned circuits using calibrated variable tuning elements. Such apparatus is expensive to build and difficult to maintain when high accuracy measurements are required. Lately, digital techniques have been employed, but the presently available devices are expensive.

It is accordingly an object of the invention to provide an improved frequency measuring apparatus.

It is another object of the invention to provide such apparatus using cycle counting techinques which has a high degree of accuracy, is reliable and is inexpensive to manufacture.

Briefly, the invention contemplates apparatus for measuring the unknown frequency of a periodically varying signal. The periodically varying signal is heterodyned with a signal of known frequency to provide a heterodyned signal. By known frequency is meant a signal having a frequency within a given range. The number of cycles of the heterodyned signal occurring in a given period of time is counted as is the number of cycles of the signal of known frequency occurring during another given period of time. The sum of the two counts is related to the unknown frequency.

Other objects, the features and advantages of the invention will be apparent from the following detailed description when read with the accompanying drawing whose sole figure shows a block diagram of apparatus for practicing the invention.

The single figure of the drawing shows a circuit diagram for the frequency measuring system.

DESCRIPTION OF THE PREFERRED EMBODIMENT

The frequency measuring apparatus as shown in the drawing measures the frequency of an AC signal from unknown frequency signal source 10 whose output is connected to one input of heterodyning means 12. Heterodyning means 12 which can be a conventional mixer receives at its second input an AC heterodyning signal of known frequency generated by conventional local oscillator 14. The local oscillator frequency need merely be in a known frequency range, but need not be precisely known but can drift as it does not effect the precision of the final measurement. The output of heterodyning means 12 is connected to I.F. amplifier 16 which can be a conventional band-pass amplifier for selecting for transmission, the AC signal having a frequency which is the difference between the unknown frequency of the signal from source 10 and the known frequency from oscillator 14. Such signal is hereinafter called the heterodyned or I.F. signal.

The output of I.F. amplifier 16 is fed to the signal input of gated amplifier 18. The signal input of a second gated amplifier 20 receives the heterodyning or local oscillator signal generated by local oscillator 14. Both gated amplifiers 18 and 20 can be conventional gated amplifiers which are normally blocked and only pass the signal received at their signal inputs to their signal outputs during the presence of a control signal at their control inputs. If required, these amplifiers can shape sinusoidal signals to square wave signals. In other words they can include amplifiers which are driven between cut-off and saturation.

The control input of gated amplifier 18 is connected to the negative output of gating voltage source 22; and the control input of gated amplifier 20 is connected to the positive output of gating voltage source 22.

Gating voltage source 22 can be a pulse generator which transmits a control pulse of known time duration from its interval output I each time it is triggered and at the same time emits sequentially a gating pulse from its positive or negative outputs. The time relationship of these pulses is shown adjacent the leads connected to the outputs. In particular if a measuring interval is between instants $a$ and $c$, then the pulse 40 on the interval output I occurs between instants $a$ and $c$. The pulse 42 on the positive output (+) of gating voltage source 22 occurs between instants $a$ and $b$, and the pulse 44 on the negative output (−) occurs between instants $b$ and $c$ when instant $b$ occurs between instants $a$ and $c$. (Such pulses are easily generated using one-shot multivibrators or when high precision is required, gated oscillators and counters.)

The outputs of gated amplifiers 18 and 20 are fed to inputs of OR-circuit 24 which can be a conventional circuit for transmitting to its output whatever signals are received at either of its inputs. The output of OR-circuit 24 is connected to the signal input of cycle counter 26 which also receives a control signal at its sampling input S from the interval output I of gating voltage source 22.

Cycle counter 26 can be a conventional pulse counter which accumulates a count of the pulses received at its signal input. It can include a gate at the signal input which is only open when a signal is present at sampling input S and it can include means for clearing the counter before each sampling cycle.

Several modes of operation of the frequency measuring operation will now be described using examples.

It is known that $Fx-Fo=Fi$, where $Fx$ = unknown frequency, $Fo$ = local oscillator frequency, and $Fi$=I.F. frequency. Now by rearranging the equation one obtains:

$Fx = Fi + Fo$ which is the basis of operation of the apparatus.

As a first example, assume switches 28, 32 and 34 are in the positions shown, the time interval $a$ to $b$ is 1 second and the time interval $b$ to $c$ is one second (therefore, the time interval $a$ to $c$ is 2 seconds). Also assume that local oscillator 14 generates a signal having a frequency of 26,527,000 Hz. In the time interval $a$ to $b$, gated amplifier 20 is open, gated amplifier 18 is blocked and the cycle counter 26 can receive and count pulses. Accordingly, the signal from local oscillator 14 passes, via the transfer contact 28c and fixed contact 28A of switch 28, the fixed contact 34A and transfer contact 34c of switch 34, the gated amplifier 20 and the OR-circuit 24, to cycle counter 26. Cycle counter 26 counts the number of pulses or cycles occurring for 1 second of the signal of local oscillator 14, i.e., Fo or 26,527,000 cycles. At instant $b$, one second after instant $a$, the control pulse to gated amplifier 20 ends and the control pulse to gated amplifier 18 begins. Gated amplifier 18 opens. Therefore, the signal from I.F. amplifier 16 passes via gated amplifier 18 and OR-circuit 24 to cycle counter 26 where its pulses or cycles are added to the previously accumulated count. At the end of the second second, counter 26 stores the count $Fo + Fi$. If the pulse count from the signal from I.F. amplifier 16 were 1,145,375 cycles, then the counter would have accumulated a count of 27,672,375 cycles. Since one second intervals were used this count is equivalent to an unknown frequency of 27,672,375 Hz. Thus by using one second intervals for both the local oscillator signal and the I.F. amplifier signal, the count in the counter represents the frequency in Hertz. If each of the intervals were a millisecond, the count in the counter would represent the frequency in Kilohertz.

Now assume, each of switches 28, 32 and 34 is in its alternate position; that $Fo = 2,652,700$ Hz, that the time interval $a$ to $b$ is ten milliseconds and the time interval $b$ to $c$ is 1 millisecond. Now the local oscillator is connected, via frequency changer 30, to heterodyning means 12.

In order to make the correct measurement frequency changer 30 must multiply the local oscillator frequency by 10. In other words the heterodyning signal must be multiplied in frequency by the same factor as the interval $a$ to $b$ (the local oscillator interval) is multiplied with respect to the interval $b$ to $c$ (the I.F. interval). It should be noted that the factor 10 is merely illustrative.

Now during the new interval $a$ to $b$ of 10 milliseconds cycle counter 26 accumulates a count of 26,527 pulses or cycles from local oscillator 14 via gated amplifier 20, and assume in the 1 millisecond interval from $b$ to $c$, 1,145 pulses or cycles are received from the I.F. amplifier 16 via gated amplifier 18. Then at the end of the measuring cycle, counter 26 will have registered a count of 27,672 indicating an unknown frequency of 27,672 Kilohertz. In this second example, if the time intervals were in seconds instead of milliseconds, then greater accuracy would be obtained because the count would register in Hertz.

If one looks more closely at the operation of the apparatus, one could say that the cycle counter is initially preset to a count related to the local oscillator frequency and that thereafter during the interval from $b$ to $c$ the counter counts up from the preset count. In such a case, local oscillator 14 and gated amplifier 20 under control of gating voltage source 22 can be considered as a counter presetting means.

If the frequency of local oscillator 14 could be rigidly maintained over long time intervals, then toggle switches or the like could be used to preset the counter and the path from local oscillator 14 to the signal input of cycle counter 26 would not be required. However, if such oscillator requirements are too expensive then the apparatus as shown, may be used.

I claim:

1. Apparatus for measuring the unknown frequency of a periodically varying signal comprising a local oscillator means for generating a periodically varying signal of known frequency, a heterodyning means having first and second inputs and an output for heterodyning the signals received at said inputs and transmitting a signal having a frequency which is the difference in the frequencies of the signals received at said inputs, said first input being adapted to receive the signal whose frequency is to be measured, said second input being connected to said local oscillator means, a signal cycle counter means for counting cycles of a periodically varying signal, said cycle counter means having an input, and means for sequentially connecting the input of said cycle counter means to said local oscillator means for a first given period of time and to the output of said heterodyning means for another given period of time.

2. The apparatus of claim 1 wherein said periods of time are the same.

3. The apparatus of claim 1 wherein said means for connecting said oscillator means to said second input of said heterodyning means includes means whereby the known frequency of the periodically varying frequency is changed by a factor $M$ and where said one given period of time is $M$ times as long as said other given period of time.

4. The apparatus of claim 1 wherein said sequentially connecting means comprises means for generating sequential first and second gating signals, first and second signal gating means each having a cyclic signal input, a gating signal input and an output, means for connecting the outputs of each of said gating means to the input of said cycle counter means, means for connecting the input of said first gating means to said local oscillator means, means for connecting the input of said second gating means to the output of said heterodyning means and means for connecting the gating signal inputs of said gating means to said gating-signal-generating means in a manner that said first gating means receives the first gating signal and said second gating means receives the second gating signal.

5. The apparatus of claim 4 wherein said means for connecting said oscillator means to said second input of said heterodyning means includes means whereby the known frequency of the periodically varying frequency is changed by a factor $M$ and where said one given period of time is $M$ times as long as said other given period of time.

6. Apparatus for measuring the unknown frequency of a periodically varying signal comprising a local oscillator means for generating a periodically varying signal of known frequency, a heterodyning means having first and second inputs and an output for heterodyning the signals received at said inputs and transmitting a signal having a frequency which is the difference in the frequencies of the signals received at said inputs, said first input being adapted to receive the signal whose frequency is to be measured, said second input being connected to said local oscillator means, a signal cycle counter means for counting cycles of a periodically varying signal, said cycle counter means having an input, means for presetting said cycle counter means to a particular count related to the number of cycles of the signal generated by said local oscillator means in a given period of time and means for connecting the input of said cycle counter means to the output of said heterodyning means for another given period of time.

* * * * *